United States Patent [19]

Anderton

[11] Patent Number: 5,292,870

[45] Date of Patent: Mar. 8, 1994

[54] REACTIVE AZO DYES INCLUDING A TRIAZINE RING AND SULPHATOVINYL OR SULPHATOETHYL SUBSTITUENTS

[75] Inventor: Kenneth Anderton, Bury, England

[73] Assignee: Imperial Chemical Industries PLC, London, England

[21] Appl. No.: 789,758

[22] Filed: Nov. 8, 1991

[30] Foreign Application Priority Data

Nov. 16, 1990 [GB] United Kingdom ............... 9025018

[51] Int. Cl.$^5$ ..................... C09B 62/51; D06P 1/38
[52] U.S. Cl. ................................. 534/638; 534/603; 534/605; 534/612; 534/632; 534/635; 534/636; 8/549
[58] Field of Search ............... 534/603, 605, 612, 632, 534/638, 635

[56] References Cited

U.S. PATENT DOCUMENTS

| | | | |
|---|---|---|---|
| 3,223,470 | 12/1965 | Boedeker et al. | 534/638 X |
| 4,906,738 | 3/1990 | Kohlhass et al. | 534/636 |
| 4,937,326 | 6/1990 | Kayane et al. | 534/638 |
| 5,003,053 | 3/1991 | Springer et al. | 534/638 |
| 5,037,965 | 8/1991 | Morimitsu et al. | 534/605 X |
| 5,093,481 | 3/1992 | Henk et al. | 534/632 |
| 5,095,102 | 3/1992 | Herd et al. | 534/638 |

FOREIGN PATENT DOCUMENTS

| | | |
|---|---|---|
| 0052985 | 6/1982 | European Pat. Off. |
| 0073406 | 3/1983 | European Pat. Off. |
| 0094055 | 11/1983 | European Pat. Off. |
| 0318968 | 6/1989 | European Pat. Off. |

59-174651 10/1984 Japan .................. 534/635

Primary Examiner—Robert W. Ramsuer
Assistant Examiner—Fiona T. Powers
Attorney, Agent, or Firm—Cushman, Darby & Cushman

[57] ABSTRACT

A compound which, in the free acid form, is of Formula (1):

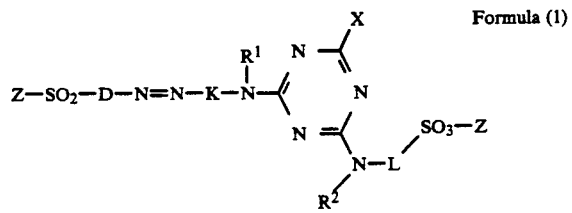

wherein:
Z is vinyl, or an ethyl group having a substituent at the 2-position which is capable of being eliminated in the presence of alkali to give a vinyl group;
D is substituted or unsubstituted phenylene or naphthylene;
K is the residue of a coupling component;
$R^1$ is H, alkyl or substituted alkyl;
$R^2$ is alkyl or substituted alkyl;
X is halo or quaternary ammonium; and
L is substituted or unsubstituted phenylene.

The compound is useful as a dye for the coloration of, for example, cotton, on which it has excellent build up, good fixation efficiency and good wash off properties.

5 Claims, No Drawings

REACTIVE AZO DYES INCLUDING A TRIAZINE RING AND SULPHATOVINYL OR SULPHATOETHYL SUBSTITUENTS

The present invention relates to reactive dyes and their use for the coloration of textiles.

According to the present invention there is provided a compound which, in the free acid form, is of the Formula (1):

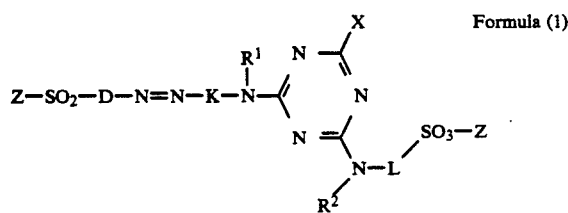

Formula (1)

wherein:
Z is vinyl, or an ethyl group having a substituent at the 2-position which is capable of being eliminated in the presence of alkali to give a vinyl group;
D is substituted or unsubstituted phenylene or naphthylene;
K is the residue of a coupling component;
$R^1$ is H, alkyl or substituted alkyl;
$R^2$ is alkyl or substituted alkyl;
X is halo or quaternary ammonium; and
L is substituted or unsubstituted phenylene.

Examples of ethyl groups having a substituent at the 2-position which is capable of being eliminated in the presence of alkali to give a vinyl group include $-CH_2CH_2OSO_3H$, $-CH_2CH_2SSO_3H$, $-CH_2CH_2Cl$ or $-CH_2CH_2OCOCH_3$. It is preferred that Z is vinyl or $-CH_2CH_2OSO_3H$.

It is preferred that D and L are each independently unsubstituted or carry 1 or 2 substituents. The substituents are preferably independently selected from $C_{1-4}$-alkyl, especially methyl; $C_{1-4}$-alkoxy, especially methoxy; sulpho; carboxy; and halo, especially chloro.

When either, or both, of D and L is substituted or unsubstituted phenylene it is preferably substituted or unsubstituted 1,3- or 1,4-phenylene.

K is preferably optionally substituted arylene, especially optionally substituted phenylene, pyrazolonylene, pyridonylene, acetoacetanilidylene or naphthylene.

As examples of phenylene groups represented by K there may be mentioned 1,4- and 1,2-phenylene which is free from substituents or is substituted by 1 or 2 groups selected from sulpho; $-NHCO.NH_2$; $-NHCO.CH_3$; $-NH_2$; $C_{1-4}$-alkyl, especially methyl; and $C_{1-4}$-alkoxy, especially methoxy. Specific examples of such phenylene groups include 1,4-phenylene, methoxy-1,4-phenylene, 2-methyl-1,4-phenylene, 2-amino5-sulpho-1,4-phenylene, 2-ureido-1,4-phenylene and 2-acetamido-5-methoxy-1,4-phenylene.

When K is 1,4-phenylene it is preferably of Formula (2):

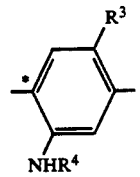

Formula (2)

wherein;
$R^3$ is H; sulpho; $C_{1-4}$-alkoxy, especially methoxy; $C_{1-4}$-alkyl, especially methyl; or halo, especially chloro; and
$R^4$ is H; $C_{1-4}$-alkanoyl, especially acetyl; or $-CONH_2$.

For clarity, in this specification an asterisk has been used to indicate which position of K is attached to the azo group represented by $Z-SO_2-D-N=N-$.

When K is 1,2-phenylene it is preferably of Formula (3):

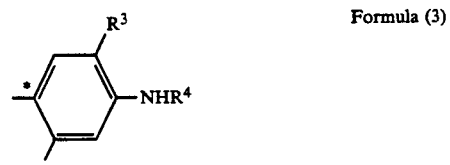

Formula (3)

wherein $R^3$ and $R^4$ are as hereinbefore defined.

The preferred optionally substituted pyrazolonylene groups represented by K are of the formula:

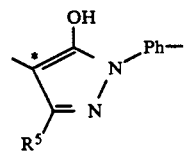

wherein
$R^5$ is $CH_3$, carboxy or $CO_2(CH_2)_nCH_3$ in which n is 0 to 3, especially $CH_3$ or carboxy; and
Ph is optionally substituted phenylene. When Ph is substituted phenylene the substituents are preferably selected from $-CH_3$, sulpho, $-Cl$ and $-OCH_3$.

The preferred optionally substituted pyridonylene groups represented by K are of the formula:

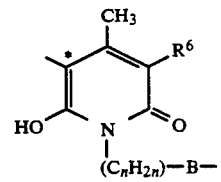

wherein
$R^6$ is H, $CONH_2$, CN, $SO_3H$, $C_{1-4}$-alkyl especially methyl, $-CH_2SO_3H$ or $-CO_2-(C_{1-4}$-alkyl);
n is 1 to 4; and
B is a direct bond, 1,2-, 1,3- or 1,4-phenylene or $-N(R^7)-$ wherein $R^7$is a $C_{1-4}$-alkyl group substituted by a sulpho or hydroxy group.

It is preferred that $R^7$ is $-CH_2CH_2OH$ or $-CH_2CH_2OSO_3H$.

As examples of the group $-(C_nH_{2n})-B-$ there may be mentioned $-CH_2CH_2-$, $-CH_2CH_2N(CH_2CH_2OH)-$ and $-CH_2CH_2N(CH_2CH_2OSO_3H)-$.

The preferred optionally substituted acetoacetanilidylene groups represented by K are either unsubstituted, or substituted by a group selected from -sulpho, —CH$_3$, —Cl and —OCH$_3$.

It is preferred that K is an optionally substituted naphthylene group. The preferred naphthylene groups have one hydroxyl substituent, and up to 2 sulphonic acid substituents. When K is a naphthylene group having one hydroxyl substituent this is preferably at the 1-position, and the azo group represented by Z—SO$_2$—D—N=N— in Formula (1) is preferably attached at the 2-position.

As examples of particularly preferred naphthylene groups represented by K there may be mentioned groups of Formula (4), and in particular the specific groups of Formula (4) mentioned in the Table A below.

TABLE A

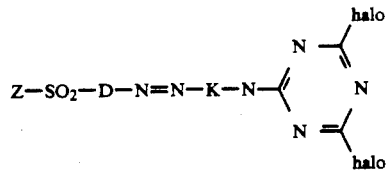

Formula (4)

| Position of —SO$_3$H | Position of —OH | Position of azo group | Position of group —NR$^1$— |
|---|---|---|---|
| 3 and 6 | 1 | 2 | 8 |
| 3 and 5 | 1 | 2 | 8 |
| 3 | 1 | 2 | 6 |
| 3 | 1 | 2 | 7 |
| 3 and 5 | 1 | 2 | 6 |

R$^1$ is preferably H, C$_{1-4}$-alkyl or substituted C$_{1-4}$-alkyl. R$^2$ is preferably C$_{1-4}$-alkyl or substituted C$_{1-4}$-alkyl.

When either of R$^1$ and R$^2$ is substituted C$_{1-4}$-alkyl it is preferable that each substituent is independently selected from —C$_{1-4}$-alkoxy, especially methoxy; sulpho; carboxy; halo, especially chloro; hydroxy and amino.

It is, however, preferred that R$^1$ is H or methyl, and R$^2$ is methyl, ethyl, n-propyl or iso-propyl.

X is preferably F, Cl or Br or a quaternary ammonium group. The preferred quaternary ammonium group is a tri(C$_{1-4}$-alkyl)ammonium group, especially (CH$_3$)$_3$N$^+$—; or a pyridinium group, especially one derived from nicotinic or iso-nicotinic acid.

A preferred sub-class of compound falling within the scope of the present invention is, in the free acid form, of Formula (5):

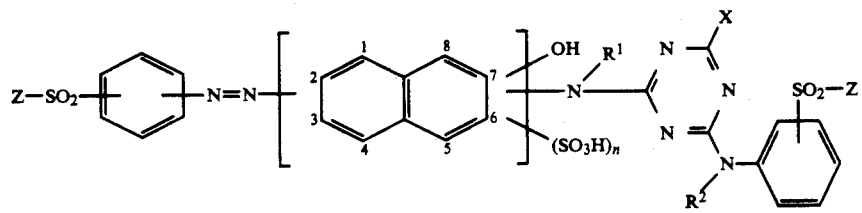

Formula (5)

wherein
Z is vinyl or beta-sulphatoethyl;
n is 1 or 2;
R$^1$ is H or C$_{1-4}$-alkyl, especially methyl;
R$^2$ is C$_{1-4}$-alkyl, preferably methyl or ethyl; and
X is halo, preferably F or Cl.

In compounds of Formula (5) it is preferred that the hydroxy group is at the 1-position, the azo group is at the 2-position and the aminotriazinyl group is at the 6, 7 or 8 position.

Particular examples of compounds of Formula (5) include those in which Z—SO$_2$— and —N=N— are para- with respect to one another, X is F or Cl, and the group —SO$_2$—Z on the phenylamino triazinyl group is para with respect to the nitrogen atom.

The present invention also provides a process for the manufacture of a compound of Formula (1) comprising the independent steps in which, (1) a compound of formula K—N(R$^1$)H is condensed, in the presence of alkali (e.g. aqueous NAOH), and at a temperature of below 5° C. (e.g. 0°-5° C.), with a solution of a cyanuric halide, to give a solution of a coupling component;

(2) a solution of a compound of formula Z—SO$_2$—D—NH$_2$ is converted into the corresponding diazonium salt by treatment with a diazotising agent (e.g. NANO$_2$), at below 5° C. (e.g. 0°-5° C.), and in the presence of hydrochloric acid. Excess nitrous acid is then destroyed by addition of sulphamic acid;

(3) the coupling component from step (1) and the diazonium salt from step (2) are stirred together at a pH of about 4 to 5 for several (e.g. 2-3) hours and at below 5° C. (e.g. 0°-5° C.);

(4) the pH of the mixture from step (3) is adjusted to about pH$_6$ to 7 and the precipitated product filtered off and dried to give a dihalo triazinyl compound of the formula:

$$Z-SO_2-D-N=N-K-N \underset{\substack{N \\ \| \\ halo}}{\overset{\substack{halo \\ | \\ N}}{<}}$$

(5) a compound of formula HN(R$^2$)—L—SO$_2$—Z is condensed with the dihalo triazinyl compound from step (4), preferably maintaining the pH at approximately 6 using an alkali such as sodium carbonate, and the product of Formula (1) wherein X is halo is precipitated by addition of an alkali metal salt, e.g. NaCl, filtered off and dried.

Compounds of Formula (1) wherein X is quaternary ammonium may be prepared by reacting the compound wherein X is halo with an appropriate amine. In the present process K, R$^1$, Z, D, R$^2$ and L are as defined in relation to Formula (1).

It is preferred that each of steps (1) to (5) is performed in aqueous solvent, especially in water.

Although acid substituents on Formula (1) are described in their free acid form in this specification, it is intended that the present invention relates not only to the free acid form of the compounds but also their salts, particularly their salts with an alkali metal such as lithium, sodium or potassium.

According to a second aspect of the present invention there is provided a composition comprising a compound of Formula (1) and an inert carrier.

It is preferred that each 100 parts of the composition comprises from 1 to 99 parts, more preferably 10 to 90 parts, especially 30 to 70 parts of a compound of Formula (1) (all parts are by weight) and the remainder of the composition comprises inert carrier.

The inert carrier preferably comprises one or more alkali metal salts, for example a sodium, lithium or potassium halide, sulphate, nitrate or sulphamate, especially NaCl.

The compositions optionally also contain up to 20 parts of a dedusting agent, such as a viscous oil, which reduces the dustiness of the composition. An example of a dedusting agent is dodecyl benzene.

A compound of Formula (1) or composition according to the second aspect of the invention is particularly notable for its excellent dyeing properties, for example its excellent build up, good fixation efficiency and good wash off on cotton. The compound is of value in both exhaust dyeing and pad batch dyeing of cotton.

According to a third aspect of the present invention there is provided a process for the colouration of materials having an —OH and/or an —NH— group comprising applying thereto a compound of Formula (1) or composition according to the second aspect of the present invention.

The —OH group-containing materials include natural or synthetic hydroxyl group-containing materials such as cellulosic textile materials, and regenerated products thereof. Examples of the cellulosic textile materials include cotton and other vegetable fibres such as linen, hemp, jute, flax and ramie fibres. Examples of the regenerated cellulosic textile materials include viscose staple and filament viscose.

The —NH— group-containing materials include synthetic or natural polyamide and polyurethane. Examples of such materials include wool and other animal furs, silk, leather, polyamide-6,6, polyamide-6.

The dyeing may be carried out in any suitable manner depending on the physical and chemical properties of the fibre materials. For example, cellulosic materials can be dyed using the compound of Formula (1) by exhaustion dyeing, padding including cold pad batch dyeing or by printing.

The exhaustion dyeing is preferably carried out in the presence of an acid binding agent such as sodium carbonate, trisodium phosphate or sodium hydroxide, optionally using a neutral salt such as sodium sulphate or sodium chloride, together with a hydrotropic agent, a penetrant or a level dyeing agent. The neutral salt suitable for promoting the exhaustion may be added to a dye bath before, during or after reaching the desired temperature for dyeing.

The padding can be carried out by padding the cellulosic textile materials at ambient temperature or an elevated temperature, and drying, steaming or dry-heating the materials to perform the dye-fixation.

The cold pad batch dyeing can be carried out by padding the cellulosic textile materials with a padding liquor at ambient temperature and allowing them to stand on a frame for 3 hours or more, or overnight, followed by washing with water and drying.

An example of dyeing by pad-batch would be to dissolve around 25 parts of a dye of Formula (1) in hot water (1000 parts) and cool to 25° C. Aqueous NAOH solution (e.g. 5.5 parts of 32.5% solution) and 50° Be water glass (ca. 150 parts) is then added to give a mixture. Cloth is then padded with the mixture, batched up, wrapped tightly with a polyethylene film and allowed to stand at above 5° C. for around 20 hours.

Thereafter the cloth is washed with water, boil-soaped with a detergent, washed again with water and dried to give dyed cloth.

The printing can be carried out in a one-phase or two-phase manner. The one-phase printing may be conducted by printing the fibre materials with a printing paste containing an acid binding agent such as sodium hydrogencarbonate, sodium carbonate or the like, followed by steaming at a temperature of 100° to 160° C. The two-phase printing may be conducted by printing the fibre materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether or the like may be used, and if desired, together with a conventional auxiliary agent such as urea and/or dispersing agent.

The acid binding agent used for fixing the compound of the present invention to the cellulosic textile materials include water-soluble basic salts of alkali or alkaline earth metals with inorganic or organic acids or compounds capable of liberating alkalis under heating conditions. The preferred acid binding agents are alkali metal hydroxides and alkali metal salts of inorganic or organic acids having a weak or medium strength. Particularly preferred are sodium salts and potassium salts. Examples of acid binding agents include sodium hydroxide, potassium hydroxide, sodium bicarbonate, sodium carbonate, sodium formate, potassium carbonate, sodium dihydrogenphosphate, disodium hydrogenphosphate, trisodium phosphate, sodium silicate and sodium trichloroacetate.

The dyeing of natural or synthetic polyamide and polyurethane fibre materials can be carried out by exhaust dyeing in an acid or weakly acidic bath whilst controlling the pH, and then making the bath neutral, or in some cases alkaline to perform the fixation. The dyeing temperature is preferably in the range of 60° to 120° C., optionally in the presence of a conventional level dyeing agent.

The present invention is illustrated by, but not limited to, the following Examples in which all parts and percentages are by weight, unless otherwise stated.

EXAMPLE 1

Preparation of the compound of Formula (6)

EXAMPLE 2

Preparation of the compound of Formula (7)

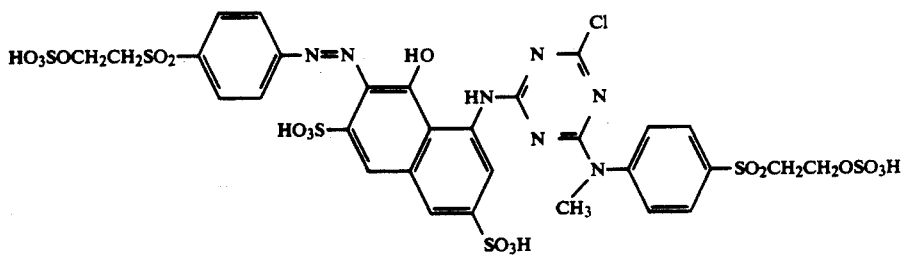

Formula (6)

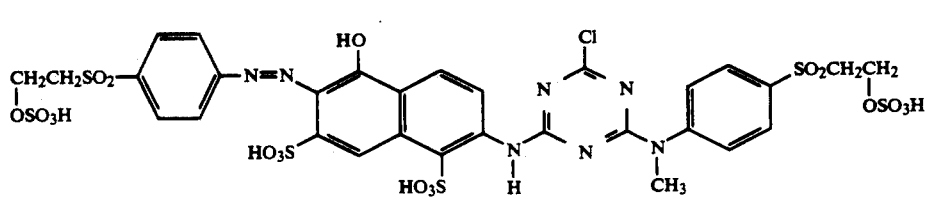

Formula (7)

2N sodium hydroxide was added to a stirred suspension of 8-amino-1-hydroxynaphthalene-3,6-disulphonic acid (319 parts) in water (5000 parts) until a complete solution of approximately pH$_{6.0}$ was obtained. This solution was added to a stirred suspension obtained by gradual addition of a solution of cyanuric chloride (203 parts) in acetone (3950 parts) to ice-water (5000 parts) at 0°–5° C. The resultant mixture was stirred for a further 1.5 hours at 0°–5° C. to give a solution of the coupling component.

To a stirred mixture of 4-(2-sulphatoethylsulphonyl)aniline (309 parts) in water (2500 parts) at 0°–5° C. was added hydrochloric acid (aqueous) (34.5% strength, 708 parts) followed by sodium nitrite solution (2N, 605 parts by volume). The mixture was stirred for 20 minutes at 0°–5° C. before destroying excess of nitrous acid by addition of sulphamic acid. The resultant diazonium salt suspension was added to the above coupling component solution, the pH raised to between 4.0 and 5.0 by addition of sodium carbonate and the mixture stirred for a further 2 hours at 0°–5° C., whilst maintaining the pH in the range 6.0 to 7.0 to give a precipitate of the azo product which was isolated by filtration and dried.

The above dry azo product (759 parts) and 4-(2-sulphatoethylsulphonyl)-N-methylaniline (338 parts) were stirred in water (6000 parts) at 30°–35° C. for 4 hours, during which the pH was maintained at 6.0 by addition of sodium carbonate as required. The product was isolated from the resultant mixture by salting with potassium chloride and the precipitate dried to give the alkali metal salt of the title compound having an absorption peak at 510 nm.

When applied to cotton by pad batch (caustic soda/sodium silicate/24 hr batching) the title compound showed excellent build up, good fixation efficiency and good wash off. When applied to cotton by exhaust dyeing (10:1 liquor ratio, 40° C., 15′ salt, 30′ ash, 60′ caustic soda) the title dye was found to have very good fixation efficiency, good build up, and a very high level of exhaustion from the dyebath.

A solution of 2-amino-5-hydroxynaphthalene-1,7-disulphonic acid (319 parts) in water (1000 parts) was adjusted to pH$_{7.0}$ by addition of 2N sodium hydroxide. This solution was added to a stirred suspension obtained by gradual addition of a solution of cyanuric chloride (203 parts) in acetone (1000 parts by volume) to ice-water (4000 parts) at 0°–5° C. The resultant mixture was stirred for a further 1.5 hours at 0°–5° C. to give a solution of the coupling component.

To a stirred mixture of 4-(2-sulphatoethylsulphonyl)aniline (337 parts) and ice-water (2000 parts) at 0°–5° C. was added aqueous hydrochloric acid (34.5% strength, 700 parts by volume) followed by sodium nitrite solution (2N, 700 parts by volume). The mixture was stirred for 20 minutes at 0°–5° C. before destroying excess of nitrous acid by addition of sulphamic acid. The resultant diazonium salt suspension was added to the above coupling component solution, the pH raised to 6.0 by addition of solid sodium carbonate and the mixture stirred for 1 hour at 0°–5° C. The azo product was isolated by salting out with potassium chloride, filtration and drying.

The above dry azo product (152 parts) and 4-(2-sulphatoethylsulphonyl)-N-methylaniline (90 parts) were stirred in water (1000 parts) at 50° C. for 24 hours, during which the pH was maintained at 7.0 by addition of 2N sodium carbonate as required. The product was precipitated by dropwise addition of ethanol to the reaction mixture, isolated by filtration and dried to give the alkali metal salt of the title compound having an adsorption peak at 480 nm.

EXAMPLES 3 TO 14

The compounds of Examples 3 to 14 of general Formula (8) may be prepared in a manner analogous to that described in Examples 1 and 2.

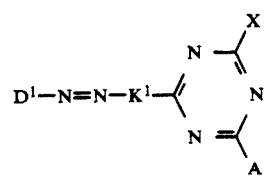

Formula (8)

| Example Number | D' | K' | X | A | Colour |
|---|---|---|---|---|---|
| 3 | 3-(SO₂CH₂CH₂OSO₃H)-phenyl | 1-OH, 2-*, 8-NH-, 6-SO₃H, 3-SO₃H naphthalene | Cl | 3-(SO₂CH₂CH₂OSO₃H)-N(C₂H₅)-phenyl | Red |
| 4 | 4-(SO₂CH₂CH₂OSO₃H), 2-OCH₃-phenyl | 1-OH, 2-*, 6-N(CH₃)-, 3-SO₃H naphthalene | Cl | 3-(SO₂CH₂CH₂OSO₃H)-N(CH₃)-phenyl | Scarlet |
| 5 | 4-(HO₃SOCH₂CH₂SO₂)-phenyl | 1-OH, 2-*, 6-N(CH₃)-, 3-SO₃H naphthalene | Cl | 3-(SO₂CH₂CH₂OSO₃H)-N(CH₃)-phenyl | Orange |
| 6 | 6-(HO₃SOCH₂CH₂SO₂), 1-SO₃H-naphthalen-2-yl | 1-OH, 2-*, 8-NH-, 6-SO₃H, 3-SO₃H naphthalene | F | 4-(SO₂CH₂CH₂OSO₃H)-N(CH₃)-phenyl | Bluish-Red |
| 7 | 4-(HO₃SOCH₂CH₂SO₂)-phenyl | 1-OH, 2-*, 8-NH-, 4-SO₃H, 3-SO₃H naphthalene | Cl | 4-(SO₂CH₂CH₂OSO₃H)-N(CH₃)-phenyl | Bluish-Red |

-continued

| Example Number | D' | K' | X | A | Colour |
|---|---|---|---|---|---|
| 8 | HO₃SOCH₂CH₂SO₂—(2,5-OCH₃, CH₃ phenyl) | pyrazolone with CO₂H, CH₃, and 2-CH₃-3-NH-5-SO₃H-phenyl | Cl | 3-(N-CH₃)-phenyl-SO₂CH₂CH₂OSO₃H | Reddish-Yellow |
| 9 | HO₃SOCH₂CH₂SO₂—(2,5-OCH₃, OCH₃ phenyl) | pyrazolone with CH₃, CH₃, and 2-CH₃-3-NH-5-SO₃H-phenyl | Cl | 3-(N-C₂H₅)-phenyl-SO₂CH₂CH₂OSO₃H | Reddish-Yellow |
| 10 | HO₃SOCH₂CH₂SO₂—(4-phenyl) | 2-SO₃H-4-NH-5-CH₃-aminobenzene | Cl | 3-(N-CH₃)-phenyl-SO₂CH₂CH₂OSO₃H | Reddish-Yellow |
| 11 | HO₃SOCH₂CH₂SO₂—(2-CH₃, 1-SO₃H naphthyl) | 2-SO₃H-4-NH-5-CH₃-aminobenzene | Cl | 3-(N-C₂H₅)-phenyl-SO₂CH₂CH₂OSO₃H | Reddish-Yellow |

-continued

| Example Number | D' | K' | X | A | Colour |
|---|---|---|---|---|---|
| 12 | HO₃SOCH₂CH₂SO₂–⟨C₆H₄⟩– | 8-amino-1-hydroxy-3,6-disulfonaphthyl (HO, NH–, HO₃S, SO₃H) | 4-carboxypyridinium (COO⁻–py-N⁺–) | 3-(N-methylamino)phenyl-SO₂CH₂CH₂OSO₃H | Bluish-Red |
| 13 | HO₃SOCH₂CH₂SO₂–⟨C₆H₄⟩– | 1-(2-hydroxyethyl-N-2-hydroxyethyl)-4-methyl-3-methyl-6-hydroxypyridone (CH₃, HO, N–CH₂CH₂NCH₂CH₂OH, O) | Cl | 3-(N-methylamino)phenyl-SO₂CH₂CH₂OSO₃H | Greenish-Yellow |
| 14 | HO₃SOCH₂CH₂SO₂–⟨C₆H₄⟩– | 1-(2-sulfatoethyl-N-2-hydroxyethyl)-4-methyl-3-methyl-6-hydroxypyridone (CH₃, HO, N–CH₂CH₂NCH₂CH₂OSO₃H, O) | Cl | 3-(N-ethylamino)phenyl-SO₂CH₂CH₂OSO₃H | Greenish-Yellow |

I claim:
1. A compound which, in the free acid form, is of Formula (1):

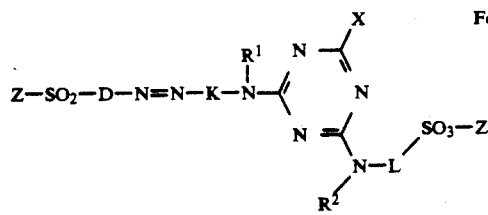

Formula (1)

wherein:
  Z is vinyl, —CH$_2$CH$_2$OSO$_3$H, —CH$_2$CH$_2$SSO$_3$H, —CH$_2$CH$_2$Cl or —CH$_2$CH$_2$OCOCH$_3$;
  D and L are phenylene;
  K is of Formula (4):

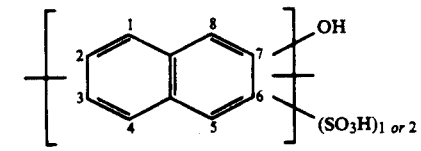

Formula (4)

R$^1$ is H or C$_{1-4}$-alkyl;
  R$^2$ is C$_{1-4}$-alkyl; and
  X is chloro.

2. A compound which, in the free acid form, is of Formula (5):

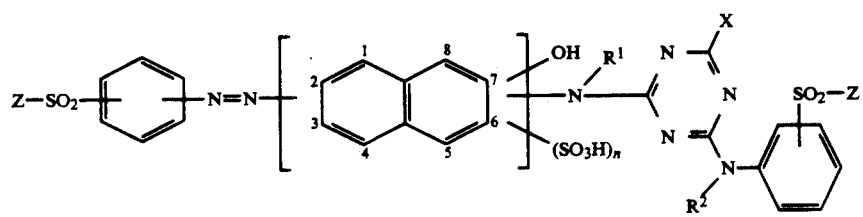

Formula (5)

wherein:
  Z is vinyl, or beta-sulphatoethyl;
  n is 1 or 2;
  R$^1$ is H or C$_{1-4}$-alkyl;
  R$^2$ is C$_{1-4}$-alkyl; and
  X is chloro.

3. A compound according to claim 2 wherein the hydroxy group is at the 1-position, the azo group is at the 2-position and the amino triazinyl group is at the 6, 7 or 8 position.

4. A compound according to claim 2 wherein R$^2$ is methyl.

5. A process for the coloration of materials having an —OH and/or an —NH— group comprising applying thereto a compound according to claim 1 or claim 2.

* * * * *

UNITED STATES PATENT AND TRADEMARK OFFICE
CERTIFICATE OF CORRECTION

PATENT NO. : 5,292,870
DATED : March 8, 1994
INVENTOR(S) : ANDERTON, Kenneth

It is certified that error appears in the above-indentified patent and that said Letters Patent is hereby corrected as shown below:

On title page,

[57] ABSTRACT, right hand side of Formula (1), change "-L-SO$_3$-Z" to -- -L-SO$_2$-Z --;

Column 1, line 18, right hand side of Formula (1), change "-L-SO$_3$-Z" to -- -L-SO$^2$-Z --, and Column 15, claim 1, line 10, right hand side of Formula (1), change "-L-SO$_3$-Z" to -- -L-SO$_2$-Z --.

Signed and Sealed this

Sixteenth Day of August, 1994

Attest:

BRUCE LEHMAN

*Attesting Officer*     *Commissioner of Patents and Trademarks*